(12) United States Patent
Chen et al.

(10) Patent No.: US 9,607,540 B2
(45) Date of Patent: Mar. 28, 2017

(54) DISPLAY PANEL

(71) Applicant: INNOLUX CORPORATION, Chu-Nan, Miao-Li County (TW)

(72) Inventors: Chien-Hung Chen, Chu-Nan (TW); Hsin-Yu Lee, Chu-Nan (TW); Hsia-Ching Chu, Chu-Nan (TW); Kuei-Ling Liu, Chu-Nan (TW); Ming-Chien Sun, Chu-Nan (TW)

(73) Assignee: INNOLUX CORPORATION, Jhu-Nan (TW)

( * ) Notice: Subject to any disclaimer, the term of this patent is extended or adjusted under 35 U.S.C. 154(b) by 16 days.

(21) Appl. No.: 14/630,401

(22) Filed: Feb. 24, 2015

(65) Prior Publication Data
US 2016/0005347 A1 Jan. 7, 2016

(30) Foreign Application Priority Data
Jul. 7, 2014 (TW) .............................. 103123284 A

(51) Int. Cl.
G09G 3/36 (2006.01)
G09G 3/20 (2006.01)
G02F 1/1337 (2006.01)
G02F 1/1343 (2006.01)
G02F 1/139 (2006.01)

(52) U.S. Cl.
CPC ....... G09G 3/2003 (2013.01); G02F 1/133707 (2013.01); G02F 1/134336 (2013.01); G02F 1/1393 (2013.01); G02F 2001/133757 (2013.01); G02F 2001/133776 (2013.01); G02F 2001/134345 (2013.01); G02F 2201/40 (2013.01); G02F 2201/52 (2013.01); G09G 2300/0426 (2013.01); G09G 2320/02 (2013.01)

(58) Field of Classification Search
CPC .............. G09G 3/2003; G09G 2320/02; G09G 2300/0426; G02F 1/134336; G02F 1/133707; G02F 2001/133757; G02F 1/1393; G02F 2001/134345; G02F 2201/40; G02F 2201/52; G02F 2001/133776; G02F 1/1343
See application file for complete search history.

(56) References Cited

U.S. PATENT DOCUMENTS

| | | |
|---|---|---|
| 2002/0012084 A1 | 1/2002 | Yoon et al. |
| 2010/0157186 A1 | 6/2010 | Kim et al. |
| 2013/0258264 A1 | 10/2013 | Peng et al. |
| 2014/0043571 A1 | 2/2014 | Chang et al. |
| 2015/0153618 A1* | 6/2015 | Hao ................. G02F 1/133514 349/106 |

* cited by examiner

Primary Examiner — Adam R Giesy
(74) Attorney, Agent, or Firm — Liu & Liu

(57) ABSTRACT

A display panel is disclosed, which comprises: a first substrate with plural pixel units formed thereon, wherein the pixel units at least comprise a first subpixel unit being a blue pixel unit and a second subpixel unit being a green pixel unit, wherein the first subpixel unit comprises a first subpixel electrode comprising a first trunk electrode, and the second subpixel unit comprises a second subpixel electrode comprising a second trunk electrode; and a second substrate opposite to the first substrate. When light passes through the display panel, a width of a first dark line corresponding to the first trunk electrode is larger than that of a second dark line corresponding to the second trunk electrode.

16 Claims, 5 Drawing Sheets

DISPLAY PANEL

CROSS REFERENCE TO RELATED APPLICATION

This application claims the benefits of the Taiwan Patent Application Serial Number 103123284, filed on Jul. 7, 2014, the subject matter of which is incorporated herein by reference.

BACKGROUND OF THE INVENTION

1. Field of the Invention

The present invention relates to a display panel and, more particularly, to a display panel with dark lines having specific widths.

2. Description of Related Art

In recent years, all the display devices are developed toward having small volume, thin thickness and light weight as the display techniques progresses. A liquid crystal display (LCD) device is a flat panel display device with a thin thickness, so a conventional cathode ray tube (CRT) display is gradually replaced by the LCD. Especially, the LCD can be applied to various fields. For example, the daily used devices such as cell phones, notebooks, video cameras, cameras, music players, navigation devices, and televisions are equipped with liquid crystal display (LCD) panels.

For the conventional LCD device, a liquid crystal layer is disposed between two electrodes, and voltage is applied onto the electrodes to control the tilt of liquid crystal molecules. Thus, it is possible to control light from a backlight module disposed below the LCD panel to pass or not pass through the liquid crystal layer, and the purpose of displaying can be achieved. In addition, the purpose of displaying different colors can be achieved through the pixel units, wherein one kind of LCD panel is a display panel composed of red, green and blue pixel units.

Since users' eyes are more sensitive to light with wavelengths around those of green light than light with other colors, the quality of the display panel can be improved by increasing the transmittance of the green pixel units. Meanwhile, the convergence of liquid crystal molecules also have to be taken into considered preventing the poor arrangement of liquid crystal molecules.

Therefore, it is desirable to provide a display panel, which has improved transmittance in green pixel units and well arrangement of liquid crystal molecules to improve the display quality thereof.

SUMMARY OF THE INVENTION

An object of the present invention is to provide a display panel, wherein a width of a dark line corresponding to a green pixel unit is smaller than that of another dark line corresponding to another pixel unit other than the green pixel unit to achieve the purpose that the green pixel unit has the largest transmittance than other pixel units have.

Another object of the present invention is to provide a display panel, wherein an ideal transmittance and a desirable arrangement of liquid crystal molecules can be obtained by controlling widths of dark lines in pixel units.

To achieve the object, an aspect of the present invention provides a display panel, which comprises: a first substrate with plural pixel units formed thereon, wherein the pixel units at least comprise a first subpixel unit being a blue pixel unit and a second subpixel unit being a green pixel unit, the first subpixel unit comprises a first subpixel electrode comprising a first trunk electrode, and the second subpixel unit comprises a second subpixel electrode comprising a second trunk electrode; and a second substrate opposite to the first substrate, wherein a width of a first dark line corresponding to the first trunk electrode is larger than that of a second dark line corresponding to the second trunk electrode when light passes through the display panel. Herein, the first dark line and the second dark line respectively corresponding to the first trunk electrode of the first subpixel unit and the second trunk electrode of the second subpixel unit are generated when a voltage is applied to the subpixel electrodes.

In this aspect of the display panel of the present invention, the pixel units may further comprise a third subpixel unit being a red pixel unit, the third subpixel unit comprises a third subpixel electrode comprising a third trunk electrode, a third dark line corresponds to the third trunk electrode when the light passes through the display panel, and a width of the first dark line or the third dark line is larger than that of a second dark line. Herein, the first dark line, the second dark line and the third dark line respectively corresponding to the first trunk electrode of the first subpixel unit, the second trunk electrode of the second subpixel unit and the third trunk electrode of the third subpixel unit are generated when a voltage is applied to the subpixel electrodes.

In this aspect of the display panel of the present invention, a ratio of a width of the first dark line corresponding to the first subpixel unit (the blue pixel unit) to that of the second dark line corresponding to the second subpixel unit (the green pixel unit) may be in a range from 1.1 to 2.0. In addition, a ratio of a width of the third dark line corresponding to the third subpixel unit (the red pixel unit) to that of the second dark line corresponding to the second subpixel unit (the green pixel unit) may be in a range from 1.1 to 2.0.

Another aspect of the present invention provides a display panel, which comprises: a first substrate with plural pixel units formed thereon, wherein the pixel units at least comprise a first subpixel unit, which comprises a first subpixel electrode comprising a first trunk electrode and a fourth trunk electrode; and a second substrate opposite to the first substrate, wherein the fourth trunk electrode intersects the first trunk electrode, and a length of the first trunk electrode is larger than that of the fourth trunk electrode, wherein a width of a first dark line corresponding to the first trunk electrode is smaller than that of a fourth dark line corresponding to the fourth trunk electrode when light passes through the display panel. Herein, the color of the subpixel unit is not particularly limited, and can be a blue pixel unit, a green pixel unit, a red pixel unit, and other pixel unit presenting other color. In addition, the first dark line and the fourth dark line respectively corresponding to the first trunk electrode and the fourth trunk electrode of the first subpixel unit are generated when a voltage is applied to the subpixel electrodes.

In this aspect of the display panel of the present invention, an angle included between the first trunk electrode and the fourth trunk electrode is in a range from 85° to 90°. That is, the first trunk electrode is substantially vertical to the fourth trunk electrode. In addition, a ratio of a width of the fourth dark line to that of the first dark line is in a range from 1.1 to 2.0.

In this aspect of the display panel of the present invention, the pixel units may at least comprise a first subpixel unit and a second subpixel unit, wherein the first subpixel unit is a blue pixel unit, the second subpixel unit is a green pixel unit, the second subpixel unit comprises a second subpixel electrode comprising a second trunk electrode and a fifth trunk electrode, the fifth trunk electrode intersects the second trunk electrode, and a length of the second trunk electrode is larger than that of the fifth trunk electrode, wherein a width of a second dark line corresponding to the second trunk electrode is smaller than that of a first dark line corresponding to the first trunk electrode when light passes through the display panel. In addition, a width of a fifth dark line corresponding to the fifth trunk electrode of the second subpixel electrode is smaller than the fourth dark line corresponding to the fourth trunk electrode of the first subpixel electrode when light passes through the display panel.

In this aspect of the display panel of the present invention, the pixel units may at least comprise a first subpixel unit, a second subpixel unit and a third subpixle unit, the first subpixel unit is a blue pixel unit, the second subpixel unit is a green pixel unit, the third subpixel unit is a red pixel unit, the structures of the first subpixel unit and the second subpixel unit are the same as those described above, the third subpixel unit comprises a third subpixel electrode comprising a third trunk electrode and a sixth trunk electrode, the third trunk electrode intersects the sixth trunk electrode, and a length of the third trunk electrode is larger than that of the sixth trunk electrode. When the light passes through the display panel, a third dark line corresponds to the third trunk electrode, a sixth dark line corresponds to the sixth trunk electrode, and a width of the second dark line is smaller than that of the first dark line or the third dark line. In addition, a width of the fifth dark line is smaller than that of the fourth dark line or the sixth dark line.

Herein, two aspects of the display panels of the present invention are provided. In other aspects of the present invention, the display panel may simultaneously comprise the features illustrated in the aforementioned two aspects of the present invention.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Figure 1:
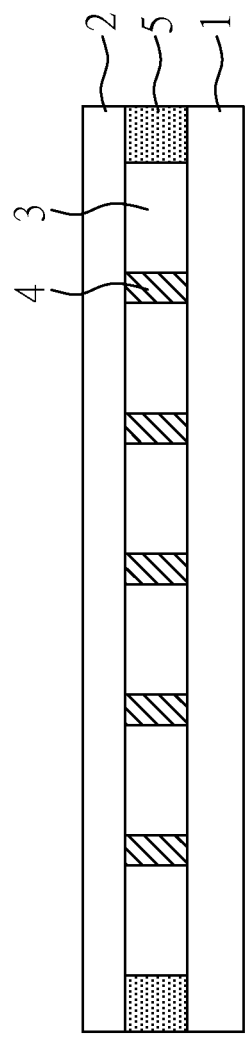
FIG. 1 is a perspective view of a liquid crystal display panel according to one preferred embodiment of the present invention.

As shown in FIG. 1, the LCD panel of the present embodiment comprises: a thin film transistor (TFT) substrate 1; a color filter (CF) substrate 2 opposite to the TFT substrate 1; plural spacers 4 disposed between the TFT substrate 1 and the CF substrate 2; a frame 5 disposed between the TFT substrate 1 and the CF substrate 2 and locating on peripheries of the TFT substrate 1 and the CF substrate 2; and a liquid crystal layer 3 disposed in a space formed by the TFT substrate 1 and the CF substrate 2. Hereinafter, a structure of the TFT substrate 1 is described in detail.

Figure 2:
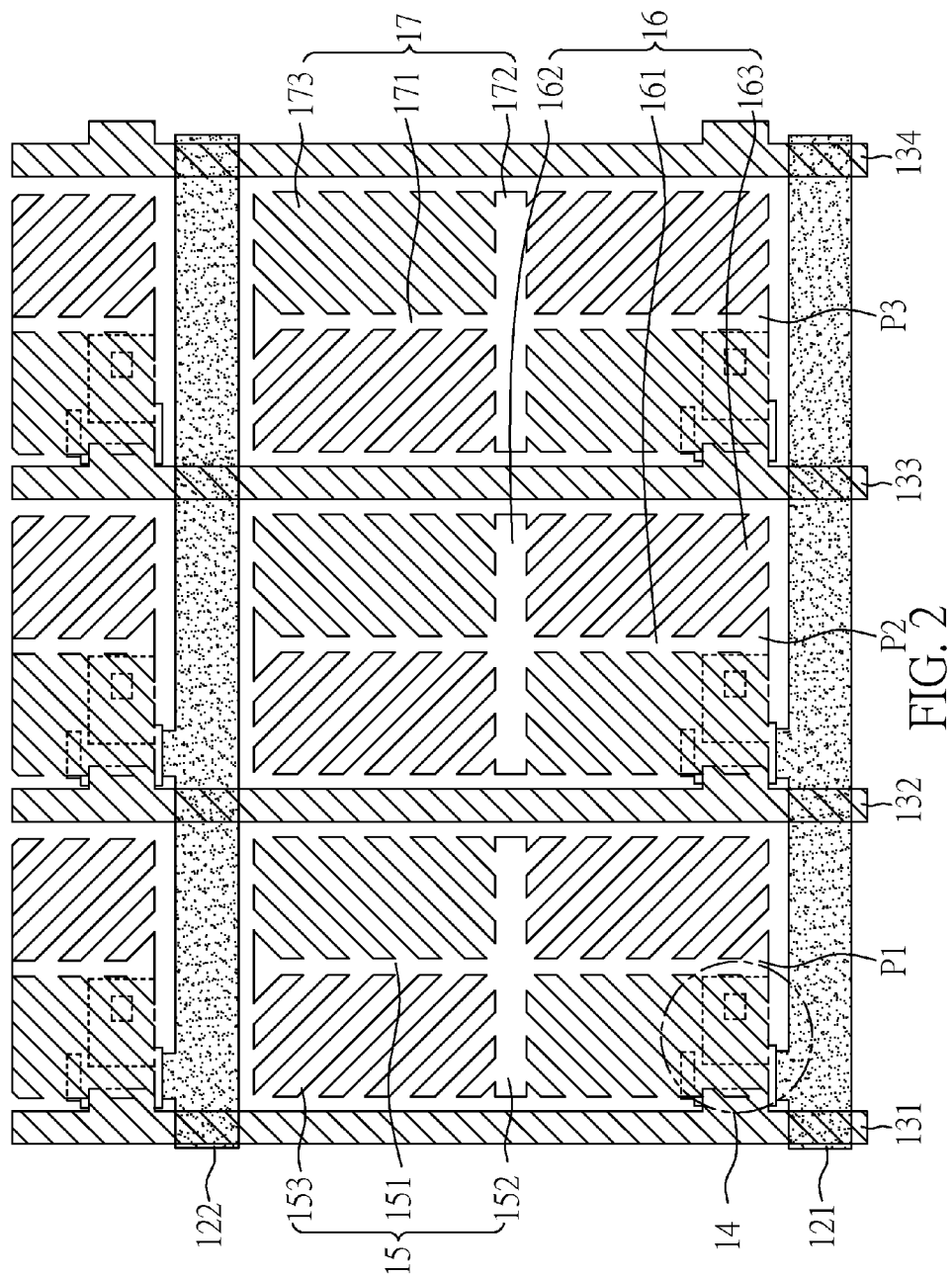
FIG. 2 is a perspective view showing a thin film transistor substrate according to one preferred embodiment of the present invention.
Figure 3:
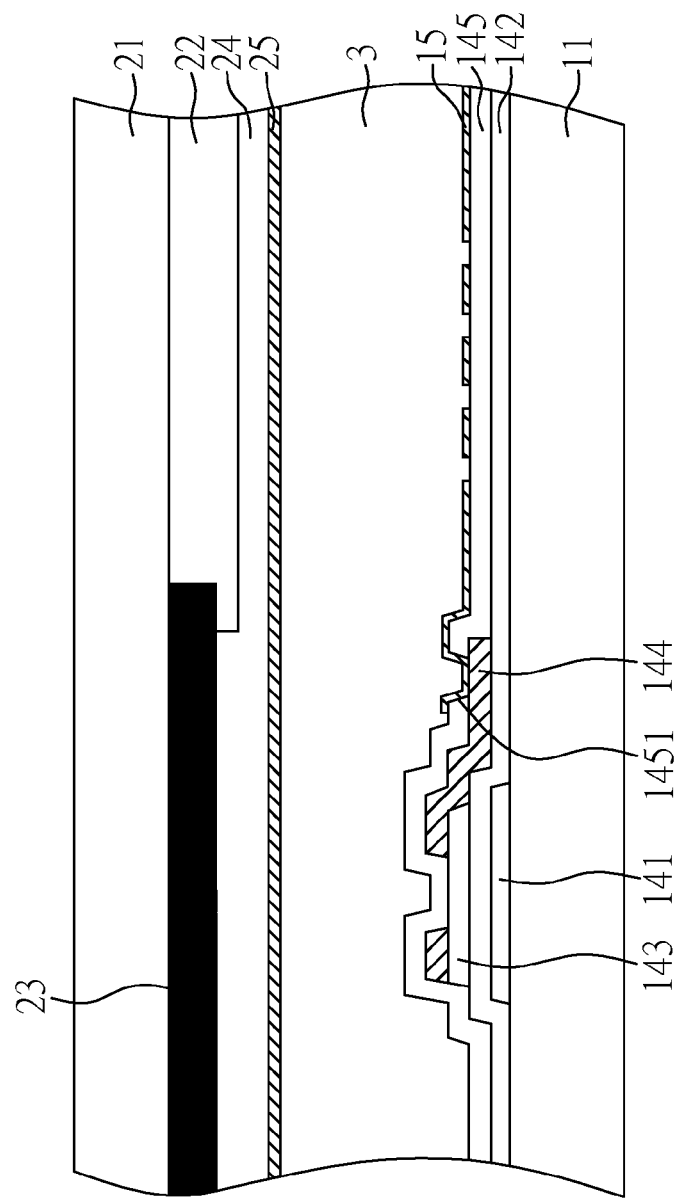
FIG. 3 is a cross-sectional view showing a liquid crystal display panel according to one preferred embodiment of the present invention.

FIG. 2 is a perspective view showing a TFT substrate of the LCD panel of the present embodiment; and FIG. 3 is a cross-sectional view showing the LCD panel of the present embodiment. As shown in FIGS. 2 and 3, the TFT substrate of the present embodiment comprises: a first substrate 11 with plural scan lines 121, 122, plural data lines 131, 132, 133, 134, a thin film transistor (TFT) unit 14, and a pixel electrode 15 formed thereon. Herein, the TFT unit 14 comprises: a gate electrode 141 on the first substrate 11; a gate insulating layer 142 disposed on the first substrate 11 and the gate electrode 141; a semiconductor layer 143 disposed on the gate insulating layer 142; a source and drain layer 144 disposed on the semiconductor layer 143; and a protection layer 145 disposed on the gate insulating layer 142, the semiconductor layer 143 and the source and drain layer 144. Herein, the protection layer 145 has an opening 1451 to expose the source and drain layer 144, and a pixel electrode 15 is disposed on the protection layer 145 and in the opening 1451 thereof to electrically connect to the source and drain layer 144. In the present embodiment, the gate electrode 141, the source and drain layer 144, the scan lines 121, 122, and the data lines 131, 132, 133, 134 can be made of any electrode materials generally used in the art; the gate insulating layer 142 and the protection layer 145 can be made of any insulating materials generally used in the art; the semiconductor layer 143 can be made of any semiconductor materials generally used in the art; and the pixel electrode 15 can be made of any transparent electrode materials such as ITO and IZO. In addition, as shown in FIG. 2, the pixel electrode 15 is a patterned electrode layer with a dendrite-like pattern or a zigzag pattern.

Furthermore, as shown in FIGS. 2 and 3, the CF substrate of the present embodiment comprises: a second substrate 21 opposite to the first substrate 11 of the TFT substrate; a black matrix 23 disposed on the second substrate 21 and corresponding to the scan lines 121, 122, and the data lines 131, 132, 133, 134; a color filter layer 22 disposed on the second substrate 21 and the black matrix 23 and corresponding to the pixel electrode 15 on the TFT substrate; a protection layer 24 disposed on the black matrix 23 and the color filter layer 22; and a common electrode 25 disposed on the protection layer 24. In the present embodiment, the black matrix 23 and the color filter layer 22 can be made of any materials generally used in the art, such as resin; the protection layer 24 can be made of any insulating materials generally used in the art; and the common electrode 25 can be made of any transparent electrode materials generally used in the art.

As shown in FIGS. 2 and 3, two adjacent scan lines 121, 122 and two adjacent data lines 131, 132, 133, 134 define plural pixel units comprising a first subpixel unit P1, a second subpixel unit P2 and a third subpixel unit P3. A first subpixel electrode 15, a second subpixel electrode 16 and a third subpixel electrode 17 are disposed between two adjacent scan lines 121, 122 and two adjacent data lines 131, 132, 133, 134, so that the first subpixel unit P1, the second subpixel unit P2 and the third subpixel unit P3 respectively comprise the first subpixel electrode 15, the second subpixel electrode 16 and the third subpixel electrode 17. In addition, the color of the pixel units comprise the first subpixel unit P1, the second subpixel unit P2 and the third subpixel unit P3 can be defined by colors of the color filter layer 22 corresponding to the first subpixel electrode 15, the second subpixel electrode 16 and the third subpixel electrode 17. In the present embodiment, the first subpixel unit P1 is a blue pixel unit, the second subpixel unit P2 is a green pixel unit, and the third subpixel unit P3 is a red pixel unit.

In addition, as shown in FIG. 2, the first subpixel electrode 15 comprises a first trunk electrode 151 and a fourth trunk electrode 152, wherein the first trunk electrode 151 is arranged along a first direction, the fourth trunk electrode 152 is arranged along a second direction. The first direction is different from the second direction, so the first trunk electrode 151 intersects the fourth trunk electrode 152. Preferably, an angle included between the first trunk electrode 151 and the fourth trunk electrode 152 is in a range from 85° to 90°. That is, the first trunk electrode 151 is substantially vertical to the fourth trunk electrode 152. In addition, in the present embodiment, a length of the first trunk electrode 151 is larger than that of the fourth trunk electrode 152. The first trunk electrode 151 and the fourth trunk electrode 152 are respectively present in linear forms; and the first subpixel electrode 15 further comprises branch electrodes 153 laterally extending from the first trunk electrode 151 and the fourth trunk electrode 152.

In addition, the second subpixel electrode 16 comprises a second trunk electrode 161 and a fifth trunk electrode 162, wherein the second trunk electrode 161 is arranged along a first direction, the fifth trunk electrode 162 is arranged along a second direction. The first direction is different from the second direction, so the second trunk electrode 161 intersects the fifth trunk electrode 162. Preferably, an angle included between the second trunk electrode 161 and the fifth trunk electrode 162 is in a range from 85° to 90°. That is, the second trunk electrode 161 is substantially vertical to the fifth trunk electrode 162. In addition, in the present embodiment, a length of the second trunk electrode 161 is larger than that of the fifth trunk electrode 162. The second trunk electrode 161 and the fifth trunk electrode 162 are respectively present in linear forms; and the second subpixel electrode 16 further comprises branch electrodes 163 laterally extending from the second trunk electrode 161 and the fifth trunk electrode 162.

Furthermore, the third subpixel electrode 17 comprises a third trunk electrode 171 and a sixth trunk electrode 172, wherein the third trunk electrode 171 is arranged along a first direction, the sixth trunk electrode 172 is arranged along a second direction. The first direction is different from the second direction, so the third trunk electrode 171 intersects the sixth trunk electrode 172. Preferably, an angle included between the third trunk electrode 171 and the sixth trunk electrode 172 is in a range from 85° to 90°. That is, the third trunk electrode 171 is substantially vertical to the sixth trunk electrode 172. In addition, in the present embodiment, a length of the third trunk electrode 171 is larger than that of the sixth trunk electrode 172. The third trunk electrode 171 and the sixth trunk electrode 172 are respectively present in linear forms; and the third subpixel electrode 17 further comprises branch electrodes 173 laterally extending from the third trunk electrode 171 and the sixth trunk electrode 172.

Figure 4:
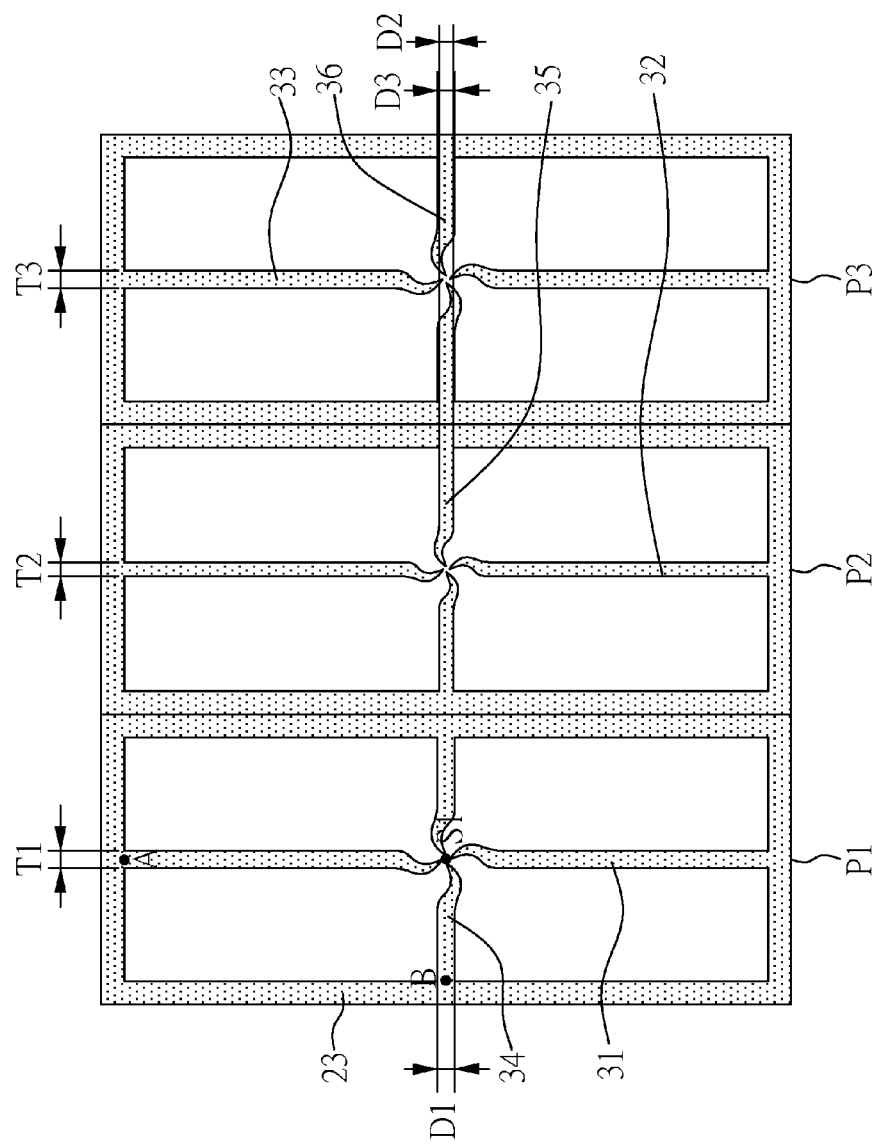
FIG. 4 is a perspective view showing dark lines in pixel units of a liquid crystal display panel according to one preferred embodiment of the present invention.

FIG. 4 is a perspective view showing dark lines in pixel units of a LCD panel of the present embodiment. As shown in FIGS. 2 and 4, when a voltage is applied to the pixel electrode 15 so that light emitting from a backlight module (not shown in figure) passes through the LCD panel, at a side of the CF substrate, the first trunk electrode 151 and the fourth trunk electrode 152 corresponding to the first subpixel unit P1 respectively correspond to a first dark line 31 and a fourth dark line 34, the second trunk electrode 161 and the fifth trunk electrode 162 corresponding to the second subpixel unit P2 respectively correspond to a second dark line 32 and a fifth dark line 35, and the third trunk electrode 171 and the sixth trunk electrode 172 corresponding to the third subpixel unit P3 respectively correspond to a third dark line 33 and a sixth dark line 36. Herein, a width T1 of the first dark line 31 corresponding to the first trunk electrode 151 of the first subpixel unit P1 (blue pixel unit) is larger than a width T2 of the second dark line 32 corresponding to the second trunk electrode 161 of the second subpxiel unit P2 (green pixel unit); and a width D1 of the fourth dark line 34 corresponding to the fourth trunk electrode 152 of the first subpixel unit P1 (blue pixel unit) is larger than a width D2 of the fifth dark line 35 corresponding to the fifth trunk electrode 162 of the second subpxiel unit P2 (green pixel unit). In addition, a width T3 of the third dark line 33 corresponding to the third trunk electrode 171 of the third subpixel unit P3 (red pixel unit) is larger than the width T2 of the second dark line 32 corresponding to the second trunk electrode 161 of the second subpxiel unit P2 (green pixel unit); and a width D3 of the sixth dark line 36 corresponding to the sixth trunk electrode 172 of the third subpixel unit P3 (red pixel unit) is larger than the width D2 of the fifth dark line 35 corresponding to the fifth trunk electrode 162 of the second subpxiel unit P2 (green pixel unit).

Since users' eyes are more sensitive to light with wavelengths around those of green light than light with other colors, the widths of the dark lines of the LCD panel of the present embodiment are adjusted to increase the transmittance of the green pixel unit. In the aforementioned LCD panel of the present embodiment, the second dark line and the fifth dark line corresponding to the second trunk electrode and the fifth trunk electrode of the green pixel unit are designed to have thinner widths than the first dark line and the fourth dark line corresponding to the first trunk electrode and the fourth trunk electrode of the blue pixel unit or the third dark line and the sixth dark line corresponding to the third trunk electrode and the sixth trunk electrode of the red pixel unit have. Thus, the purpose of increasing the transmittance of the green pixel unit can be achieved.

As shown in FIG. 4, in the present embodiment, a ratio of the width T1 of the first dark line 31 corresponding to the first subpixel unit P1 to the width T2 of the second dark line 32 corresponding to the second subpixel unit P2 is in a range from 1.1 to 2.0; and a ratio of the width T3 of the third dark line 33 corresponding to the third subpixel unit P3 to the width T2 of the second dark line 32 corresponding to the second subpixel unit P2 is in a range from 1.1 to 2.0. In addition, a ratio of the width D1 of the fourth dark line 34 corresponding to the first subpixel unit P1 to the width D2 of the fifth dark line 35 corresponding to the second subpixel unit P2 is in a range from 1.1 to 2.0; and a ratio of the width D3 of the sixth dark line 36 corresponding to the third subpixel unit P3 to the width D2 of the fifth dark line 35 corresponding to the second subpixel unit P2 is in a range from 1.1 to 2.0.

As shown in FIGS. 2 and 4, in the present embodiment, a length of the first trunk electrode 151 is larger than that of the fourth trunk electrode 152 in the first subpixel unit P1, a length of the second trunk electrode 161 is larger than that of the fifth trunk electrode 162 in the second subpixel unit P2, and a length of the third trunk electrode 171 is larger than that of the sixth trunk electrode 172 in the third subpixel unit P3. In the first subpixel unit P1, the width T1 of the first dark line 31 corresponding to the first trunk electrode 151 is smaller than the width D1 of the fourth dark line 34 corresponding to the fourth trunk electrode 152. In the second subpixel unit P2, the width T2 of the second dark line 32 corresponding to the second trunk electrode 161 is smaller than the width D2 of the fifth dark line 35 corresponding to the fifth trunk electrode 162. In the third subpixel unit P3, the width T3 of the third dark line 33 corresponding to the third trunk electrode 171 is smaller than the width D3 of the sixth dark line 36 corresponding to the sixth trunk electrode 172.

For the first subpixel unit P1 as an example, since the length of the first trunk electrode 151 is larger than that of the fourth trunk electrode 152, liquid crystal molecules rotating from a singular point Si have larger space to converge toward an end point A. On the other hand, the fourth trunk electrode 152 has shorter length, so the liquid crystal molecules rotating from the singular point Si do not have enough space to converge toward an end point B. Therefore, the convergent degrees of the liquid crystal molecules in these two directions are different. Since the liquid crystal molecules along the first trunk electrode 151 have larger space to converge toward the end point A, the width T1 of the first dark line 31 can be reduced for the purpose of high transmittance. On the other hand, since the liquid crystal molecules along the fourth trunk electrode have smaller space to converge toward the end point B, the width D1 of the fourth dark line 34 can be increased to prevent the poor convergence, which results in the poor arrangement of the liquid crystal molecules. In the region having increased width, the liquid crystal molecules have smaller deformation and lower elastic energy, and therefore the problem of poor arrangement of liquid crystal molecules can be prevented. Similarly, based on the same reason stated above, the width T2 of the second dark line 32 in the second subpixel unit P2 and the width T3 of the third dark line 33 in the third subpixel unit P3 are respectively designed to be respectively smaller than the width D2 of the fifth dark line 35 and the width D3 of the sixth dark line 36.

As shown in FIG. 4, in the present embodiment, a ratio of the width D1 to the width T1, a ratio of the width D2 to the width T2, and a ratio of the width D3 to the width T3 are all respectively in a range from 1.1 to 2.0 in the first subpixel unit P1, the second subpixel unit P2 and the third subpixel unit P3.

Figure 5:
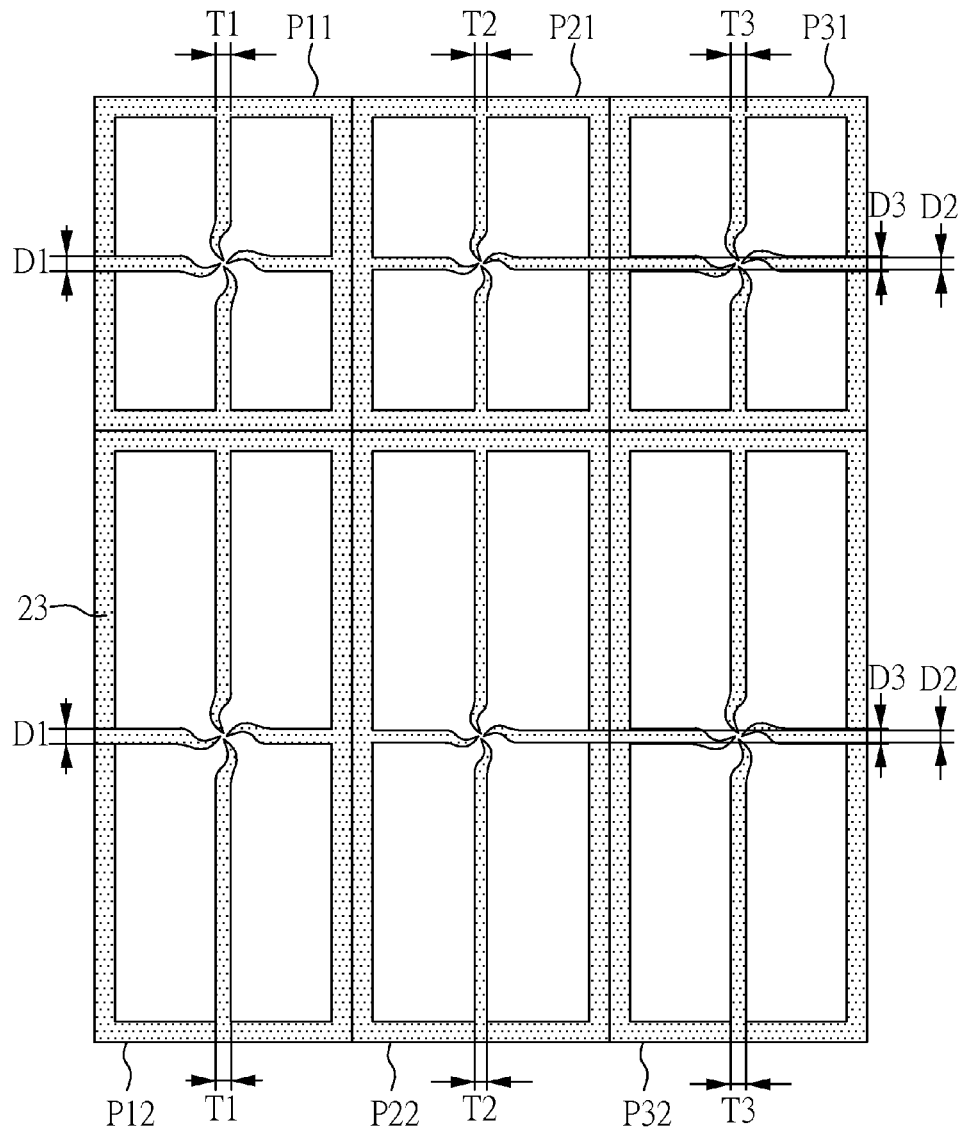
FIG. 5 is a perspective view showing dark lines in pixel units of a liquid crystal display panel according to another preferred embodiment of the present invention.

FIG. 5 is a perspective view showing dark lines in pixel units of a LCD panel according to another preferred embodiment of the present invention. The LCD panel of the present embodiment is similar to that shown in FIG. 4, except that the first subpixel unit comprises a bright region P11 and a dark region P12, the second subpixel unit comprises a bright region P21 and a dark region P22, and the third subpixel unit also comprises a bright region P31 and a dark region P32.

In all the embodiments illustrated above, the widths of the dark lines can be adjusted by at least one manners illustrated below to achieve the aforementioned features. For example, widths of trunk electrodes, widths of a black matrix corresponding to the dark lines, widths of metal lines on pixel electrodes, and voltage applied to each pixel unit (wherein, the larger the applied voltage, the thinner the corresponding dark lines). In addition, in all the embodiments of the present invention, the term "a width of a dark line" refers to a full width at half maximum (FWHM) of a bright distribution curve along a width of a trunk electrode. Furthermore, in all the embodiments of the present invention, the term "a width of a dark line" preferably refers to a maximum width of the dark line.

In a preferred embodiment shown in FIG. 5 of the present invention, the widths T1, T2 and T3 of the first dark line 31, the second dark line 32 and the third dark line 33, as well as the widths D1, D2, D3 of the fourth dark line 34, the fifth dark line 35 and the sixth dark line 36 of parts of the first subpixel unit P1, the second subpixel unit P2 and the third subpixel unit P3 are shown in the following Table 1.

TABLE 1

|  | Third subpixel unit (Red pixel unit) | Second subpixel unit (Green pixel unit) | First subpixel unit (Blue pixel unit) |
| --- | --- | --- | --- |
| Dark region | T3 = 5.66 μm | T2 = 4.40 μm | T1 = 6.29 μm |
| Dark region | D3 = 6.32 μm | D2 = 4.74 μm | D1 = 6.76 μm |
| Bright region | T3 = 4.40 μm | T2 = 3.77 μm | T1 = 6.60 μm |
| Bright region | D3 = 5.22 μm | D2 = 4.74 μm | D1 = 7.14 μm |

From the results shown in Table 1, in both the dark regions and the bright regions, the width T2 and the width D2 of the dark lines of the second subpixel unit are respectively smaller than the width T1 and the width D1 of the dark lines of the first subpixel unit or the width T3 and the width D3 of the dark lines of the third subpixel unit. In addition, in all the dark regions and the bright regions of the first subpixel unit, the second subpixel unit and the third subpixel unit, the widths T1, T2 and T3 are respectively smaller than the widths D1, D2 and D3.

Furthermore, as shown in Table 1, a variation between the widths T2 and D2 in the bright region of the second subpixel unit is about 20% [(4.74−3.77)/4.74=20%]; a variation between the widths T2 and D2 in the dark region of the second subpixel unit is about 7% [(4.74−4.40)/4.74=7%]. A variation between the width D1 in the bright region of the first subpixel unit and the width D2 in the bright region of the second subpixel unit is about 34% [(7.14−4.74)/7.14=34%]; a variation between the width D2 in the bright region of the second subpixel unit and the width D3 in the bright region of the third subpixel unit is about 9% [(5.22−4.74)/5.22=9%]; a variation between the width T1 in the bright region of the first subpixel unit and the width T2 in the bright region of the second subpixel unit is about 42% [(6.60−3.77)/6.60=42%]; and a variation between the width T2 in the bright region of the second subpixel unit and the width T3 in the bright region of the third subpixel unit is about 14% [(4.40−3.37)/4.40=14%].

In the aforementioned embodiment, only the LCD panel with the TFT substrate and the CF substrate opposite thereto is disclosed, and the TFT substrate provided by the present invention can also be applied to other types of LCD panels such as that equipped with a color filter on array (COA) substrate.

Furthermore, the display device provided by the aforementioned embodiments of the present invention can be applied to any electronic device for displaying images, such as a mobile phone, a notebook, a camera, a video camera, a music player, a navigation system, or a television.

Although the present invention has been explained in relation to its preferred embodiment, it is to be understood that many other possible modifications and variations can be made without departing from the spirit and scope of the invention as hereinafter claimed.

What is claimed is:

1. A display panel, comprising:
   a first substrate with plural pixel units formed thereon, wherein the pixel units at least comprise a first subpixel unit being blue color and a second subpixel unit being green color, the first subpixel unit comprises a first subpixel electrode comprising a first trunk electrode, and the second subpixel unit comprises a second subpixel electrode comprising a second trunk electrode; and
   a second substrate opposite to the first substrate,
   wherein a width of a first dark line corresponding to the first trunk electrode is larger than a width of a second dark line corresponding to the second trunk electrode when light passes through the display panel.

2. The display panel as claimed in claim 1, wherein the pixel units further comprise a third subpixel unit being red color, the third subpixel unit comprises a third subpixel electrode comprising a third trunk electrode, a third dark line corresponds to the third trunk electrode when the light passes through the display panel, and the width of the first dark line or a width of the third dark line is larger than the width of a second dark line.

3. The display panel as claimed in claim 2, wherein a ratio of the width of the third dark line to the width of the second dark line is in a range from 1.1 to 2.0.

4. The display panel as claimed in claim 1, wherein a ratio of the width of the first dark line to the width of the second dark line is in a range from 1.1 to 2.0.

5. The display panel as claimed in claim 1, wherein the first subpixel electrode further comprises a fourth trunk electrode, the second subpixel electrode further comprises a fifth trunk electrode, the fourth trunk electrode intersects the first trunk electrode, the fifth truck electrode intersects the second trunk electrode, a length of the first trunk electrode is larger than a length of the fourth trunk electrode, a length of the second trunk electrode is larger than a length of the fifth trunk electrode, wherein a fourth dark line corresponds to the fourth trunk electrode and a fifth dark line corresponds to the fifth trunk electrode when the light passes through the display panel, the width of the first dark line is smaller than a width of the fourth dark line, and the width of the second dark line is smaller than a width of the fifth dark line.

6. The display panel as claimed in claim 5, wherein an angle included between the first trunk electrode and the fourth trunk electrode and another angle included between the second trunk electrode and the fifth trunk electrode are respectively in a range from 85° to 90°.

7. The display panel as claimed in claim 5, wherein the width of the fourth dark line is larger than the width of the fifth dark line when the light passes through the display panel.

8. The display panel as claimed in claim 5, wherein the pixel units further comprise a third subpixel unit being red color, the third subpixel unit comprises a third subpixel electrode comprising a third trunk electrode and a sixth trunk electrode, a length of the third trunk electrode is larger than a length of a sixth trunk electrode, wherein a third dark line corresponds to a third trunk electrode and a sixth dark line corresponds to the sixth trunk electrode when the light passes through the display panel, the width of the first dark line or a width of the third dark line is larger than the width of the second dark line, and the width of the fourth dark line or a width of the sixth dark line is larger than the width of the fifth dark line.

9. The display panel as claimed in claim 5, wherein a ratio of the width of the fourth dark line to the width of the first dark line is in a range from 1.1 to 2.0.

10. A display panel, comprising:
    a first substrate with plural pixel units formed thereon, wherein the pixel units at least comprise a first subpixel unit, which comprises a first subpixel electrode comprising a first trunk electrode and a fourth trunk electrode; and
    a second substrate opposite to the first substrate,
    wherein the fourth trunk electrode intersects the first trunk electrode, and a length of the first trunk electrode is larger than a length of the fourth trunk electrode,
    wherein a width of a first dark line corresponding to the first trunk electrode is smaller than a width of a fourth dark line corresponding to the fourth trunk electrode when light passes through the display panel.

11. The display panel as claimed in claim 10, wherein an angle included between the first trunk electrode and the fourth trunk electrode is in a range from 85° to 90°.

12. The display panel as claimed in claim 10, wherein the pixel units further comprise a second subpixel unit, the first subpixel unit is blue color, the second subpixel unit is green color, the second subpixel unit comprises a second subpixel electrode comprising a second trunk electrode and a fifth trunk electrode, the fifth trunk electrode intersects the second trunk electrode, and a length of the second trunk electrode is larger than a length of the fifth trunk electrode, wherein a width of a second dark line corresponding to the second trunk electrode is smaller than the width of a first dark line corresponding to the first trunk electrode when light passes through the display panel.

13. The display panel as claimed in claim 10, wherein the pixel units further comprise a second subpixel unit, the first subpixel unit is blue color, the second subpixel unit is green color, the second subpixel unit comprises a second subpixel electrode comprising a second trunk electrode and a fifth trunk electrode, the fifth trunk electrode intersects the second trunk electrode, and a length of the second trunk electrode is larger than a length of the fifth trunk electrode, wherein when the light passes through the display panel, a second dark line corresponds to the second trunk electrode, a fifth dark line corresponds to the fifth trunk electrode, and a width of the fifth dark line is smaller than the width of the fourth dark line.

14. The display panel as claimed in claim 10, wherein the pixel units further comprise a second subpixel unit and a third subpixel unit, the first subpixel unit is blue color, the second subpixel unit is green color, the third subpixel unit is red color, the second subpixel unit comprises a second subpixel electrode comprising a second trunk electrode and a fifth trunk electrode, the fifth trunk electrode intersects the second trunk electrode, a length of the second trunk electrode is larger than a length of the fifth trunk electrode, the third subpixel unit comprises a third subpixel electrode comprising a third trunk electrode and a sixth trunk electrode, the third trunk electrode intersects the sixth trunk electrode, and a length of the third trunk electrode is larger than a length of the sixth trunk electrode, wherein when the light passes through the display panel, a second dark line corresponds to the second trunk electrode, a third dark line corresponds to the third trunk electrode, a fifth dark line corresponds to the fifth trunk electrode, a sixth dark line corresponds to the sixth trunk electrode, and a width of the second dark line is smaller than the width of the first dark line or a width of the third dark line.

15. The display panel as claimed in claim 10, wherein the pixel units further comprise a second subpixel unit and a third subpixle unit, the first subpixel unit is blue color, the second subpixel unit is green color, the third subpixel unit is red color, the second subpixel unit comprises a second subpixel electrode comprising a second trunk electrode and a fifth trunk electrode, the fifth trunk electrode intersects the second trunk electrode, a length of the second trunk electrode is larger than a length of the fifth trunk electrode, the third subpixel unit comprises a third subpixel electrode comprising a third trunk electrode and a sixth trunk electrode, the third trunk electrode intersects the sixth trunk electrode, and a length of the third trunk electrode is larger than a length of the sixth trunk electrode, wherein when the light passes through the display panel, a second dark line corresponds to the second trunk electrode, a third dark line corresponds to the third trunk electrode, a fifth dark line corresponds to the fifth trunk electrode, a sixth dark line corresponds to the sixth trunk electrode, and a width of the fifth dark line is smaller than the width of the fourth dark line or a width of the sixth dark line.

16. The display panel as claimed in claim 10, wherein a ratio of the width of the fourth dark line to the width of the first dark line is in a range from 1.1 to 2.0.

* * * * *